United States Patent [19]

George

[11] 4,094,399
[45] June 13, 1978

[54] OSCILLATING FEED ASSEMBLY AND DRIVE ESPECIALLY FOR A DRYER CONVEYOR

[75] Inventor: K. A. George, Levittown, Pa.

[73] Assignee: Procter & Schwartz, Inc., Philadelphia, Pa.

[21] Appl. No.: 709,494

[22] Filed: Jul. 28, 1976

[51] Int. Cl.² ............................................. B65G 47/20
[52] U.S. Cl. .................................... 198/535; 198/631
[58] Field of Search .............. 198/359, 360, 436, 442, 198/489, 490, 535, 536, 578, 587, 728, 733, 748, 342, 631; 34/165, 166, 184; 74/37

[56] References Cited

U.S. PATENT DOCUMENTS

| | | | |
|---|---|---|---|
| 870,005 | 11/1907 | Wirtz et al. | 74/37 |
| 1,120,977 | 12/1914 | Roosa | 198/536 |
| 1,996,535 | 4/1935 | Beck | 198/535 |
| 2,136,560 | 11/1938 | Nichols | 198/536 |
| 2,289,943 | 7/1942 | Thum | 198/442 |
| 2,371,931 | 3/1945 | Start et al. | 74/37 |
| 2,391,785 | 12/1945 | Jordon | 74/37 |
| 3,067,857 | 12/1962 | Thomas et al. | 198/631 |
| 3,307,415 | 3/1967 | Dobbs | 74/37 |
| 3,352,403 | 11/1967 | Blake | 198/728 |
| 3,773,165 | 11/1973 | Tolles | 198/578 |

FOREIGN PATENT DOCUMENTS 6,989 of 1928 Australia .............................. 198/436

Primary Examiner—Evon C. Blunk
Assistant Examiner—Richard K. Thomson
Attorney, Agent, or Firm—Richard H. Thomas

[57] ABSTRACT

Shown is an apparatus for distributing particulate material onto a conveyor belt for a dryer comprising a feedchute which is pivotally mounted above the belt so that the discharge end of the chute laterally traverses the conveyor belt surface. The drive to pivot the chute comprises an endless chain with an adjustable linkage between the chain and chute reciprocating the chute into successive traverses with a quick return at the end of each traverse.

5 Claims, 5 Drawing Figures

OSCILLATING FEED ASSEMBLY AND DRIVE ESPECIALLY FOR A DRYER CONVEYOR

The present invention relates to a distributing apparatus and the drive therefor for distributing particulate material onto a conveyor belt. The invention is particularly described with reference to a conveyor for a dryer, but it will be apparent that the invention has other applications.

BACKGROUND OF THE INVENTION

It is known to provide dryers for particulate material in which an oscillating feed-chute laterally traverses the upper surface of the dryer conveyor belt to deposit material on the belt. Conventionally such a feed-chute is driven by a disc crank which gives a simple, harmonic reciprocating motion to the chute. The harmonic motion results in a product spread which is non-uniform on the conveyor belt, with the deposition of too much material along the sides of the belt and too little in the middle two-thirds width of the belt. This substantially and adversely affects the performance of the dryer.

An improvement is known in which a hydraulic mechanism drives the reciprocating feed-chute. The hydraulic mechanism has a very fast, quick return at the end of each traverse resulting in a more uniform spread of particulate material onto the conveyor belt. However, the cost of such a hydraulic mechanism has increased substantially resulting in the need for an inexpensive, mechanical drive which is capable of spreading the product uniformly enough on the conveyor belt to ensure proper drying.

SUMMARY OF THE INVENTION

In accordance with the concepts of the present invention, there is provided a distributing apparatus for distributing particulate material onto a conveyor belt upper surface which comprises a distributing feed-chute including a discharge end through which the particulate material flows. Means are provided for pivotally supporting the feed-chute. A drive means includes an endless chain with an adjustable linkage between the chain and chute which causes the latter to successively traverse the conveyor belt upper surface. The chain is driven on relatively small, spaced-apart end sprockets so that the chute makes a quick return at the end of each traverse.

Preferably, the assembly of the present invention is for a dryer in which the conveyor belt passes through the dryer and the feed-chute is adjacent the inlet end of the dryer.

In a preferred aspect of the present invention, the roller chain comprises a pair of parallel chain strands driven on pairs of end sprockets. The sprocket teeth are subjected to very high loads when the feed-chute reverses in direction, and the use of a pair of chain strands and pairs of end sprockets ensures that the sprocket teeth of the small diameter sprockets will take the loads.

In an embodiment of the invention, the endless drive chain is a roller chain having a plurality of pins connecting successive links of the chain. An adjacent pair of extended pins of one link extend laterally from the chain and support a circular driving pin. The linkage includes a rigid connecting rod provided with a circular bearing surface which pivotally engages the chain driving pin.

In another embodiment of the present invention, the roller chain comprises a pair of parallel chain strands which are spaced apart from each other. The extended pins which support the driving pin reach between the chain strands, and the driving pin is thus supported between the strands.

In a preferred aspect of the invention, the endless drive chain travels around a pair of spaced-apart sprockets positioned such that the connecting rod longitudinal axis is substantially in line with the pair of sprocket centers. In this way, the motion of the drive chain pins is transmitted efficiently and directly to the connecting rod ensuring a uniform traversing motion of the feed-chute.

BRIEF DESCRIPTION OF THE DRAWINGS

The invention and advantages thereof will become apparent from the following description with reference to the accompanying drawings, in which.

Figure 1:
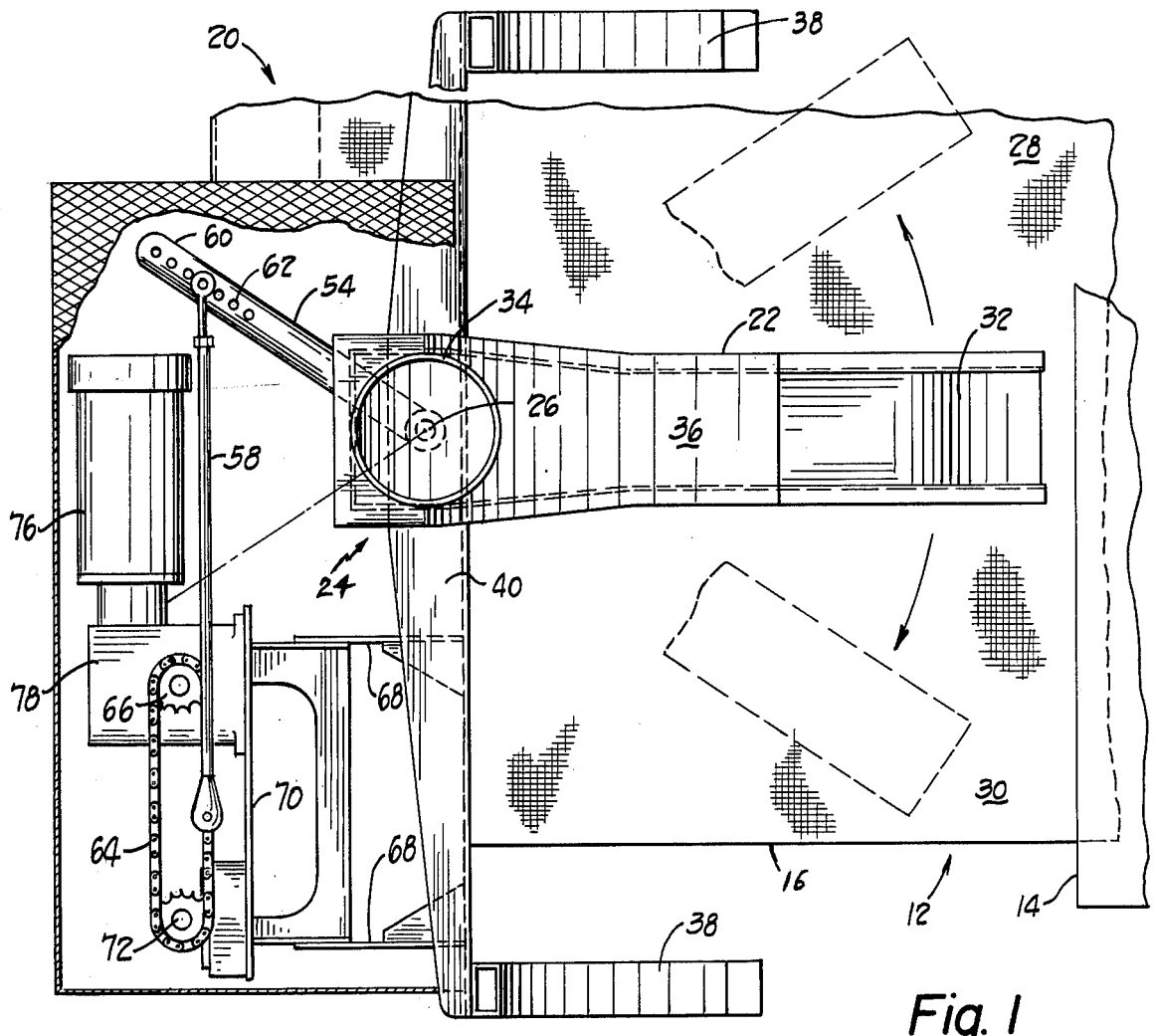
FIG. 1 is a plan view of a dryer and conveyor distributing apparatus for particulate material including a drive mechanism in accordance with the concepts of the present invention.
Figure 2:
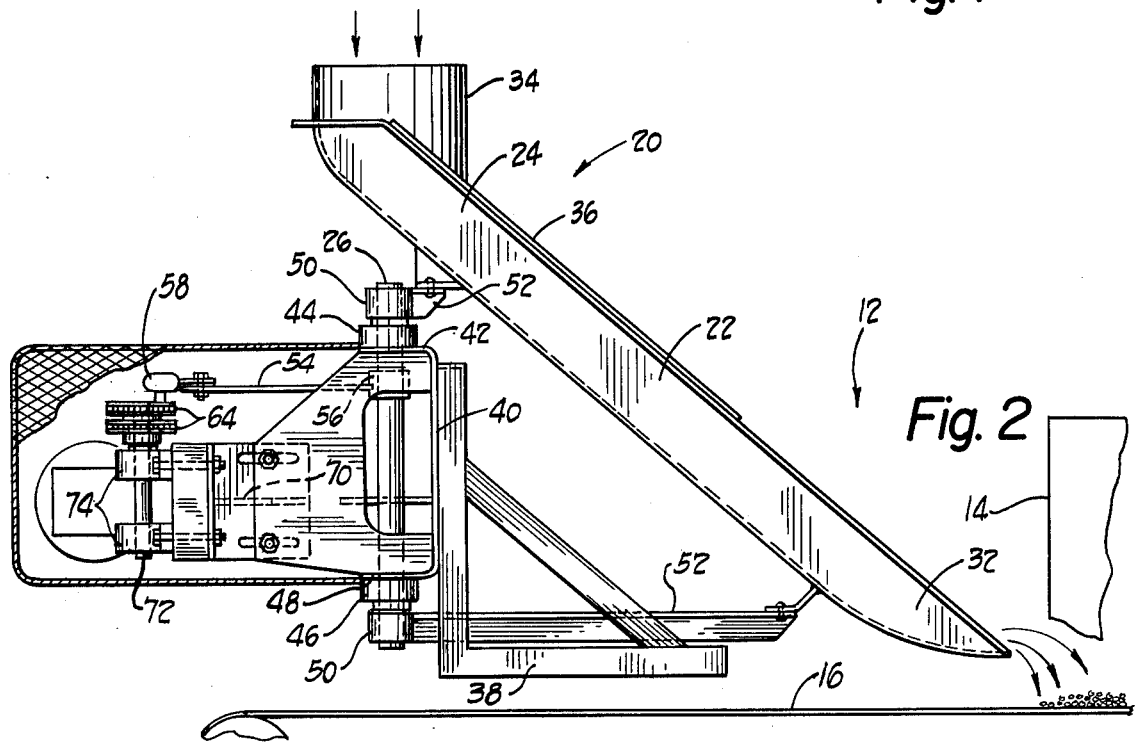
FIG. 2 is a side elevation view of the dryer and assembly of FIG. 1.

Referring to the drawings, and in particular FIGS. 1 and 2, there is illustrated a dryer 12 having a dryer housing 14 of conventional design. A conveyor belt 16 is provided with an upper carrying run which extends through the dryer housing. The conveyor belt is of conventional endless design, adapted to convey particulate material to be dried in the dryer housing. The lower return run of the endless belt is not shown.

A distributing apparatus generally indicated by the numeral 20 is used to distribute the particulate material onto the conveyor belt upper run. The main element of the distributing apparatus is a chute 22 which is pivotably supported at one end 24 to swing back and forth in an arc on a pivot post 26. As shown in FIG. 1, the chute makes about a 60° swing from one side 28 of the conveyor belt to the other (indicated by number 30) traversing the belt in a reciprocating motion. FIG. 2 shows that the chute is angled in a downward direction with respect to the conveyor belt having a discharge end 32 adjacent to the surface of the conveyor belt 16. Thus, material to be distributed on the conveyor belt flows by gravity flow in the chute. It is possible to conduct the particulate material in the chute by means other than gravity, for instance hydraulically or mechanically. The particulate material is introduced into the chute 22 through receiving nozzle 34 by a suitable, endless transport conveyor or other means (not shown). Cover 36 prevents loss of particulate material from the chute.

The support for the chute 22 is best shown in FIG. 2 and comprises a pair of spaced-apart L-shaped brackets 38 which are floor supported and to which is welded a U-shaped flange 40 extended between the brackets. The flange has an upper horizontal portion 42 which provides a bearing surface for a collar 44 affixed to pivot post 26. A similar lower collar 46 on the pivot post engages portion 48 of the flange, and the two collars thus hold the pivot post securely at a desired elevation. The opposite ends of the pivot post are engaged by support rings 50 which in turn are secured via braces 52 to the opposite ends of the feed-chute.

The drive for the chute 22, shown in FIGS. 1 and 2, includes a lever arm 54 which extends horizontally from a collar 56 rigidly affixed (such as by welding or with a set screw) to the pivot post 26. The rigid connection is necessary so that the chute moves with reciprocation of the lever arm. A connecting rod 58 is attached to the lever arm, near its free end 60, at one of several connecting points 62 for adjustability of the amount of swing of chute 22. The connecting rod is adjustable in length as well. The opposite end of the connecting rod is connected in a manner to be described to a double strand endless roller chain 64 which travels on a pair of sprockets 66 suitably supported by the distributing apparatus.

This is accomplished by means of spaced-apart brackets 68 welded to one end of the U-shaped flange 40 as shown in FIG. 1. A horizontally extending, T-shaped flange 70 is slidably supported between the brackets 68 so that it can move for the purpose of adjustment towards or away from the flange 40 of the distributing apparatus. The sprockets 66 for the endless roller chain are then supported on the flange 70. This is accomplished through spaced-apart support pins 72 mounted in support bearings 74 supported by the flange 70.

Movement of the endless chain and thus reciprocation of lever 54 and chute 22 is accomplished by means of a motor 76 acting through speed reducing gear 78 on support pins 72 for drive sprocket 66.

Advantages of the invention should now be apparent. The sprockets 66 are relatively small in diameter. Thus, the connecting rod 58 on passing around the circumference of a sprocket makes a quick reverse in direction. Thus, the chute 22 is as quickly reversed in direction, depositing a minimum amout of material on the sides of the conveyor belt. The result is a relatively even distribution of particulate material across the width of the conveyor belt for uniform and proper drying.

An aspect of the present invention should also be evident from FIGS. 1 and 2. As shown in FIG. 1, the axis of the connecting rod 58, throughout the reciprocating motion of the lever arm 54, remains substantially in line with the centers for the sprockets 66 for the drive chain. This enables the motion and force of the drive chain to be transmitted efficiently with minimum losses to the reciprocating lever 54 and chute 22 to ensure a uniform angular motion to the lever arm.

It is apparent that the dwell of the chute 22 at the opposite ends of its traverse can be increased or decreased by adjusting the ratio of chain length to sprocket pitch diameter.

Figure 3:
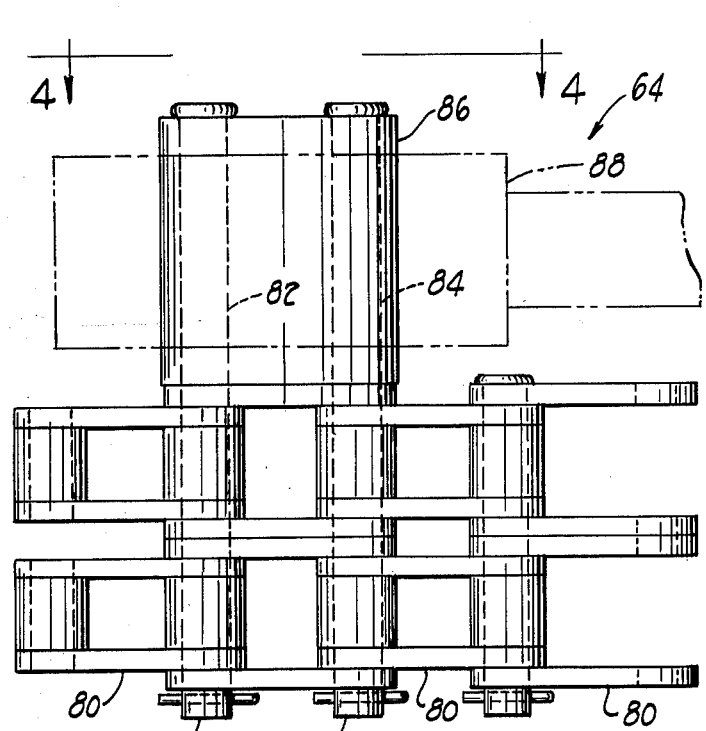
FIG. 3 is an enlarged detail view of a portion of the drive chain for the drive mechanism of FIG. 1 illustrating certain aspects of the present invention.
Figure 4:
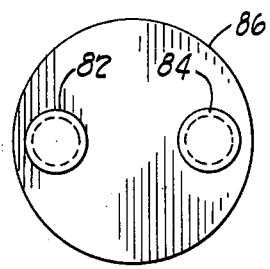
FIG. 4 is a side elevation view of a portion of the chain of FIG. 3.

Details of the roller chain are illustrated in FIGS. 3 and 4. In particular, each link 80 of the roller chain is connected by a pin with a successive link. In the embodiment shown, two adjacent link pins 82 and 84 extend laterally from one side of the chain and support a circular housing pin 86. This housing pin provides a bearing support for the bearing end 88 of the connecting rod opposite that attached to the lever arm. In the embodiment illustrated in FIGS. 3 and 4, the roller chain is a double strand chain comprising the two strands side-by-side. This ensures a smooth, reversing motion, less vibration, and longer life for the distributing apparatus.

Figure 5:
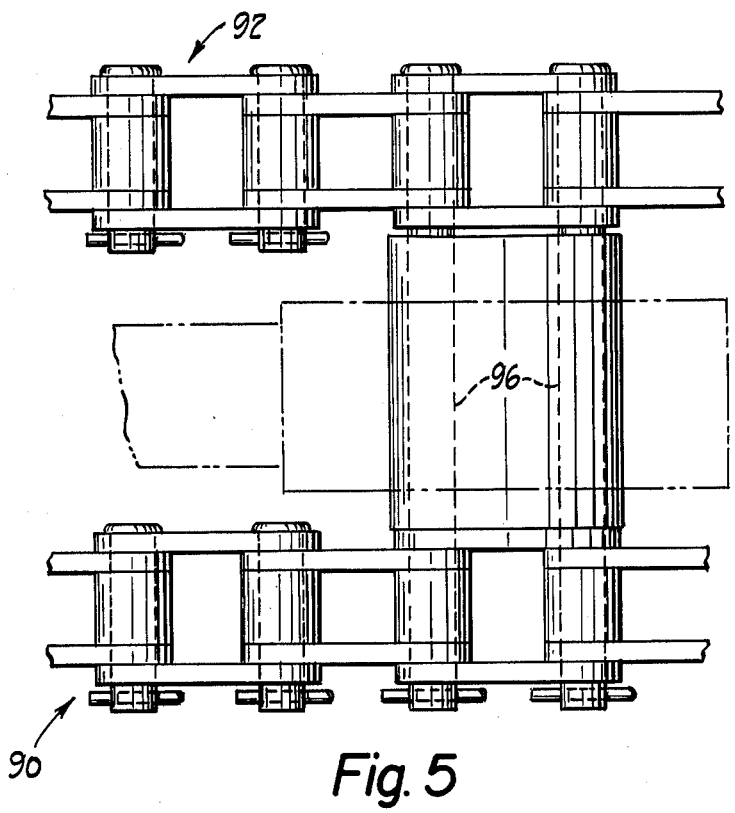
FIG. 5 is an enlarged detail view of an embodiment in accordance with the concepts of the present invention.

An embodiment of the invention is illustrated in FIG. 5. In this embodiment, the chain is also a double strand roller chain, but the single strands 90 and 92 of the chain are spaced apart with the extended pins 96 for the supporting links extending between the chains. These pins support, between the strands 90 and 92, the housing pin 98 which engages the connecting rod bearing. This embodiment has the further advantage of giving improved rigidity to the drive assembly, minimum pin wear, and improved transmission of power.

The present invention is of substantial commercial significance. It will be recalled that a simple crank drive mechanism gives only a simple harmonic motion in which the feed-chute starts to slow down as it approaches an edge of the conveyor, coming to a gradual stop, then picking up speed again on the return. This results in the piling of material much deeper at each edge of the dryer conveyor, and non-uniform drying. Among other disadvantages, more energy is required to dry the same amount of material. By contrast, the present invention results in a uniform distribution of particulate material onto the conveyor belt, with a proportionate reduction in energy used. Drying of particulate material is an energy intensive process, and as the cost of energy increases, the savings becomes quite significant. At the same time, this savings is accomplished in a facile, reliable and inexpensive manner.

The use of double chain strands illustrated in FIGS. 3, 4 and 5 is an important aspect of the present invention. In order to obtain a quick reversal in the direction of movement of the distributing feed-chute, the end sprockets for the roller chain are made very small. The sprocket teeth are thus subjected to very high loads when the feed-chute reverses in direction, because of rapid acceleration and deceleration forces, and if only one pair of end sprockets is employed with a single strand, the sprocket teeth could shear off. The use of double chain strands and a corresponding number of end sprocket pairs ensures that the sprocket teeth will take the load.

What is claimed is:

1. A dryer for particulate material comprising
a dryer housing;
conveyor means having a conveyor carrying run adapted to convey particulate material to said housing;
a distributing feed-chute including a discharge end for uniformly distributing particulate material onto the conveyor means carrying run;
pivot means pivotally supporting said feed-chute so that the discharge end is above the conveyor carrying run;
a drive means adapted to pivot said feed-chute so that it traverses the conveyor carrying run with quick reversal of the feed-chute discharge end at the end of each traverse, said drive means thereby being subjected to rapid acceleration and deceleration forces, said drive means including a continuous chain drive;
said chain drive comprising a double strand roller chain, a plurality of pins connecting successive links of said chain strands, an adjacent pair of said pins extending laterally from said chain strands, and a bearing pin supported by said pairs of pins;
a pair of spaced-apart sprockets on which said chain drive is mounted, said sprockets being of relatively small diameter adapted to effect said quick reversal of the feed-chute discharge end;
a lever arm to pivot said chute; and
linkage means between said chain drive and lever arm connected to said chain drive bearing pin whereby the feed-chute discharge end reciprocatingly traverses the conveyor means carrying run on movement of the bearing pin between the chain drive sprockets.

2. The apparatus of claim 1 wherein said feed-chute is supported at an angle with respect to the conveyor carrying run so that the material therein gravity flows from said chute to the conveyor.

3. The apparatus of claim 1 wherein the strands of said double strand of the roller chain are side-by-side, the laterally extending pins extending to one side of said pair of strands.

4. The apparatus of claim 1 wherein the strands of said double strand are spaced apart, said bearing pin being between said strands.

5. The apparatus of claim 2 wherein said linkage means comprises a connecting arm, said connecting arm axis being substantially in alignment with the line defined by the sprocket centers.

* * * * *

UNITED STATES PATENT AND TRADEMARK OFFICE
CERTIFICATE OF CORRECTION

PATENT NO. : 4,094,399
DATED : June 13, 1978
INVENTOR(S) : K. A. George

It is certified that error appears in the above-identified patent and that said Letters Patent are hereby corrected as shown below:

On the title page, item [73] Assignee, change "Procter" to --Proctor--.

Signed and Sealed this

*Twenty-first* Day of *November 1978*

[SEAL]

*Attest:*

RUTH C. MASON
*Attesting Officer*

DONALD W. BANNER
*Commissioner of Patents and Trademarks*